US012628222B2

(12) United States Patent
Purkayastha et al.

(10) Patent No.: US 12,628,222 B2
(45) Date of Patent: May 12, 2026

(54) RRC CONFIGURATION FOR SINGLE LINK, DUAL SUBSCRIBER IDENTITY MODULE DUAL ACTIVE (DSDA)

(71) Applicant: QUALCOMM Incorporated, San Diego, CA (US)

(72) Inventors: Punyaslok Purkayastha, San Diego, CA (US); Gavin Bernard Horn, La Jolla, CA (US); Ozcan Ozturk, San Diego, CA (US); Juan Zhang, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 636 days.

(21) Appl. No.: 18/005,925

(22) PCT Filed: Sep. 24, 2020

(86) PCT No.: PCT/CN2020/117327
    § 371 (c)(1),
    (2) Date: Jan. 18, 2023

(87) PCT Pub. No.: WO2022/061633
    PCT Pub. Date: Mar. 31, 2022

(65) Prior Publication Data
    US 2023/0300923 A1     Sep. 21, 2023

(51) Int. Cl.
    *H04W 76/15*     (2018.01)
    *H04W 76/34*     (2018.01)
    *H04W 88/06*     (2009.01)

(52) U.S. Cl.
    CPC ........... *H04W 76/15* (2018.02); *H04W 76/34* (2018.02); *H04W 88/06* (2013.01)

(58) Field of Classification Search
    CPC ..... H04W 76/15; H04W 76/34; H04W 88/06; H04W 8/183; H04W 8/26; H04W 8/082; H04W 60/04
    See application file for complete search history.

(56) References Cited

U.S. PATENT DOCUMENTS

| 9,769,867 B2 | 9/2017 | Ramkumar et al. |
| 2015/0264602 A1 | 9/2015 | Hageltorn et al. |

(Continued)

FOREIGN PATENT DOCUMENTS

| CN | 104115454 A | 10/2014 |
| CN | 108811187 A | 11/2018 |

(Continued)

OTHER PUBLICATIONS

Supplementary Partial European Search Report—EP20954485—Search Authority—Berlin—May 29, 2024.

(Continued)

*Primary Examiner* — Vinncelas Louis
(74) *Attorney, Agent, or Firm* — QUALCOMM Incorporated

(57) ABSTRACT

A Single-Link DSDA apparatus is disclosed. In one aspect of the disclosure, the RRC connections associated with two SIMS have common connections that can both be reconfigured by providing one SIM with the configuration for its RRC connection along with an indication that the other SIM is to use the common configuration for its RRC configuration. In other aspects of the disclosure, a primary SIM is established which can only perform certain tasks. In still other aspects of the disclosure RRC connection establishment and release of a dual-SIM UE can be performed by using on the primary connection to send common configuration, and using both connection for different configurations.

21 Claims, 11 Drawing Sheets

(56) References Cited

U.S. PATENT DOCUMENTS

| | | | | |
|---|---|---|---|---|
| 2017/0150545 A1* | 5/2017 | Ramkumar | ........... | H04W 8/082 |
| 2018/0132289 A1 | 5/2018 | Zhao et al. | | |
| 2023/0112588 A1* | 4/2023 | Zhu | ....................... | H04W 60/04 |
| | | | | 370/329 |
| 2023/0239941 A1* | 7/2023 | Selvaganapathy | ...... | H04W 8/26 |
| | | | | 370/328 |
| 2024/0007842 A1* | 1/2024 | Adusumilli | ........... | H04W 8/183 |

FOREIGN PATENT DOCUMENTS

| | | | |
|---|---|---|---|
| CN | 110710262 A | 1/2020 |
| CN | 111527761 A | 8/2020 |
| CN | 111586717 A | 8/2020 |

OTHER PUBLICATIONS

Supplementary European Search Report—EP20954485—Search Authority—Berlin—Aug. 30, 2024.
Huawei, et al., "Overview of Rel-17 Work Areas for NR and LTE", 3GPP TSG RAN Meeting #84, RP-191486, Final (WAS RP-191007), 3rd Generation Partnership Project, Mobile Competence Centre, 650, Route Des Lucioles, F-06921, Sophia-Antipolis, vol. TSG RAN, No. Newport Beach, USA, Jun. 3, 2019-Jun. 6, 2019, Jun. 4, 2019, 22 Pages, May 29, 2019, XP051748412.
International Search Report and Written Opinion—PCT/CN2020/117327—ISA/EPO—Jun. 23, 2021.

* cited by examiner

700

| RRC function/ procedure <br> 702 | Whether primary RRC only performs the function <br> 704 | Whether both primary and secondary RRC perform the function <br> 706 |
|---|---|---|
| Connected mode handover | No | Yes |
| RLF detection and recovery — PHY, MAC RLF detection | Yes | No |
| RLF detection and recovery — RRC re-establishment | No | Yes |
| UL/DL information transfer procedures | No | Yes |
| Failure information procedures (MCG or SCG failure) | No | Yes |
| RRM and measurement reporting | Yes | No |
| RRC reconfiguration | No | Yes |
| RRC release | No | Yes |
| RRC resume | No | Yes |
| UE information procedure | No | Yes |

FIG. 7

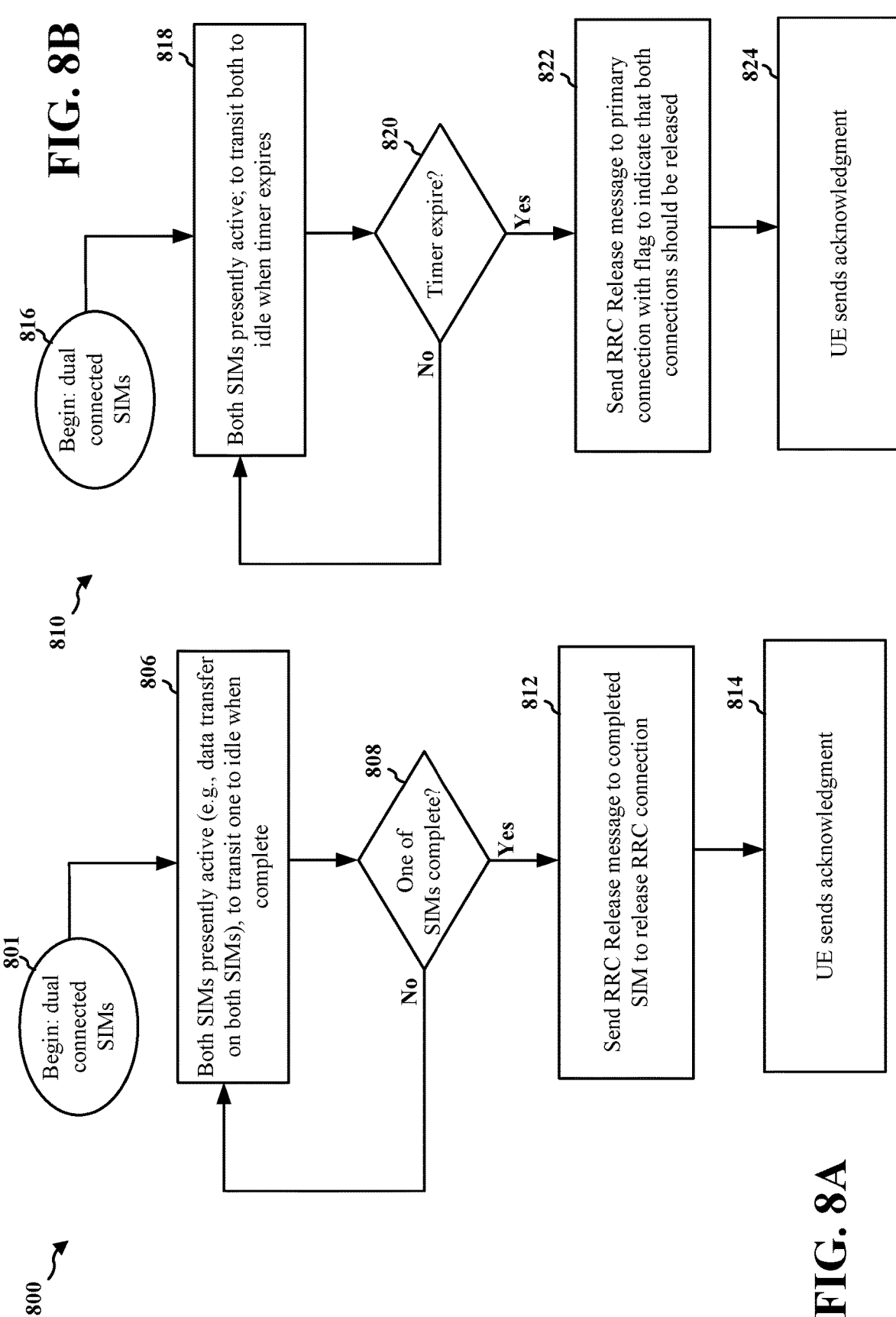

FIG. 8B

816 Begin: dual connected SIMs

818 Both SIMs presently active; to transit both to idle when timer expires

820 Timer expire?

822 Send RRC Release message to primary connection with flag to indicate that both connections should be released 824 UE sends acknowledgment

801 Begin: dual connected SIMs

806 Both SIMs presently active (e.g., data transfer on both SIMs), to transit one to idle when complete 808 One of SIMs complete?

812 Send RRC Release message to completed SIM to release RRC connection

814 UE sends acknowledgment

800

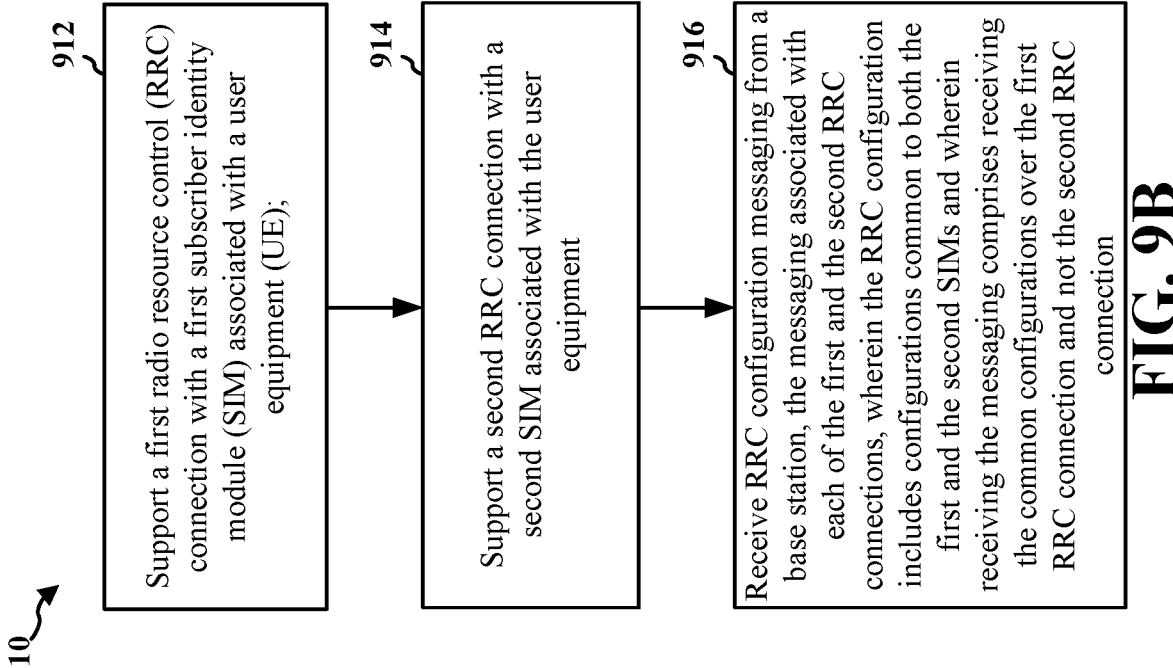

912

Support a first radio resource control (RRC) connection with a first subscriber identity module (SIM) associated with a user equipment (UE);

914

Support a second RRC connection with a second SIM associated with the user equipment

916

Receive RRC configuration messaging from a base station, the messaging associated with each of the first and the second RRC connections, wherein the RRC configuration includes configurations common to both the first and the second SIMs and wherein receiving the messaging comprises receiving the common configurations over the first RRC connection and not the second RRC connection

Support a first radio resource control (RRC) connection with a first subscriber identity module (SIM) associated with a user equipment (UE)

904

Support a second RRC connection with a second SIM associated with the user equipment

906

Message an RRC configuration associated with each of the first and the second RRC connections, wherein the RRC configuration includes configurations common to both the first and the second SIMS, and wherein the messaging comprises providing the common configurations over the first RRC connection and not the second RRC connection

RRC CONFIGURATION FOR SINGLE LINK, DUAL SUBSCRIBER IDENTITY MODULE DUAL ACTIVE (DSDA)

CROSS REFERENCE TO RELATED APPLICATION(S)

This application is a National Phase entry of PCT Application No. PCT/CN2020/117327, entitled "RRC CONFIGURATION FOR SINGLE LINK, DUAL SUBSCRIBER IDENTITY MODULE DUAL ACTIVE (DSDA)" and filed on Sep. 24, 2020, which is expressly incorporated by reference herein in its entirety.

BACKGROUND

Technical Field

The present disclosure relates generally to communication systems, and more particularly, to dual subscriber identity modules (SIMs) in a single user equipment.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

As wireless networks become increasingly sophisticated, the UEs have begun to incorporate dual SIM card (SIMs) into a single user equipment in a technology known as Dual-Sim Dual Active (DSDA). DSDA has numerous applications and advantages in advancing the sophistication and task-parallel nature of individual UEs. Dual SIMs also can offer much wider network coverage, multiple service providers, different SIMS for voice and data, increased speeds, simultaneously calling, customizable storage, and the like.

To date, however, little to no progress has been made with respect to enhancing dual-SIM configuration procedures in the context of advanced wireless networks. One example relates to radio resource control (RRC) configuration procedures. RRC connection and configuration procedures often require initializing the SIM with substantial amounts of information. No attempts have as yet been made by practitioners to address, much less streamline or prioritize, such procedures. As a result, modern RRC connection and configuration procedures consume significant network bandwidth and produce conspicuous latencies to the user during these procedures. Furthermore, existing single-SIM implementations would render a dual-SIM solution inoperable, and little if any progress has been made in exploring, much less reaching any accord on, viable solutions for dual-SIM RRC configurations and related technology.

As a result, different aspects of the disclosure have modernized DSDA-based connection and configuration procedures. In some configurations, RRC configurations have herein been partitioned into common configurations versus separable configurations. Common configurations have been subdivided into different types as well. Among other benefits, the common configurations associated with otherwise network-taxing RRC reconfiguration procedures need no longer be applied to both SIMs. The same benefits apply to RRC connection establishment and release as well, substantially reducing the network footprint caused by dual-SIM UEs.

In an aspect of the disclosure, a method, a computer-readable medium, and an apparatus are provided. The method at a base station includes supporting a first radio resource control (RRC) connection with a first subscriber identity module (SIM) associated with a user equipment (UE); supporting a second RRC connection with a second SIM associated with the user equipment; and messaging an RRC configuration associated with each of the first and the second RRC connections, wherein the RRC configuration includes configurations common to both the first and the second SIMs and wherein the messaging comprises providing the common configurations over the first RRC connection and not the second RRC connection.

Another method of wireless communication at a base station includes supporting a first radio resource control (RRC) connection with a first subscriber identity module (SIM) associated with a user equipment (UE), supporting a second RRC connection with a second SIM associated with the user equipment, and configuring the first RRC connection as a primary connection, wherein a message sent via the primary connection to perform a specified function is also configured to perform the function on the second RRC connection.

Another method of wireless communication at a user equipment (UE) includes supporting a first radio resource control (RRC) connection with a first subscriber identity module (SIM) associated with a user equipment (UE), supporting a second RRC connection with a second SIM associated with the user equipment, and receiving a message from the base station that the first RRC connection is a primary connection, wherein a message received via the primary connection to perform a specified function is also configured to perform the function on the second RRC connection.

A base station includes a memory and at least one processor coupled to the memory. The at least one processor is configured to support a first radio resource control (RRC) connection with a first subscriber identity module (SIM) associated with a user equipment (UE); support a second RRC connection with a second SIM associated with the user equipment; and message an RRC configuration associated with each of the first and the second RRC connections, wherein the RRC configuration includes configurations common to both the first and the second SIMs and wherein the messaging comprises providing the common configurations over the first RRC connection and not the second RRC connection.

Another base station includes a memory, and at least one processor coupled to the memory and configured to support a first radio resource control (RRC) connection with a first subscriber identity module (SIM) associated with a user equipment (UE), support a second RRC connection with a second SIM associated with the user equipment, and configure the first RRC connection as a primary connection, wherein a message sent via the primary connection to perform a specified function is also configured to perform the function on the second RRC connection.

A user equipment (UE) includes a memory, and at least one processor coupled to the memory and configured to support a first radio resource control (RRC) connection with a first subscriber identity module (SIM) associated with a user equipment (UE), support a second RRC connection with a second SIM associated with the user equipment, and receive RRC configuration messaging from a base station, the messaging associated with each of the first and the second RRC connections, wherein the RRC configuration includes configurations common to both the first and the second SIMs and wherein receiving the messaging comprises receiving the common configurations over the first RRC connection and not the second RRC connection.

Another user equipment (UE) includes a memory, at least one processor coupled to the memory and configured to support a first radio resource control (RRC) connection with a first subscriber identity module (SIM) associated with a user equipment (UE), support a second RRC connection with a second SIM associated with the user equipment, and receive a message from the base station that the first RRC connection is a primary connection, wherein a message received via the primary connection to perform a specified function is also configured to perform the function on the second RRC connection.

A non-transitory computer-readable medium is also included. The computer-readable medium includes code that, when executed by at least one processor, causes the at least one processor to support a first radio resource control (RRC) connection with a first subscriber identity module (SIM) associated with a user equipment (UE), support a second RRC connection with a second SIM associated with the user equipment; and message an RRC configuration associated with each of the first and the second RRC connections, wherein the RRC configuration includes configurations common to both the first and the second SIMs and wherein the messaging comprises providing the common configurations over the first RRC connection and not the second RRC connection.

Another computer-readable medium includes code that, when executed by at least one processor, is configured to support a first radio resource control (RRC) connection with a first subscriber identity module (SIM) associated with a user equipment (UE), support a second RRC connection with a second SIM associated with the user equipment, and configure the first RRC connection as a primary connection, wherein a message sent via the primary connection to perform a specified function is also configured to perform the function on the second RRC connection.

Another computer-readable medium includes code that, when executed by at least one processor, is configured to support a first radio resource control (RRC) connection with a first subscriber identity module (SIM) associated with a user equipment (UE), support a second RRC connection with a second SIM associated with the user equipment, and receive RRC configuration messaging from a base station, the messaging associated with each of the first and the second RRC connections, wherein the RRC configuration includes configurations common to both the first and the second SIMs and wherein receiving the messaging comprises receiving the common configurations over the first RRC connection and not the second RRC connection.

Another computer-readable medium includes code that, when executed by at least one processor, is configured to support a first radio resource control (RRC) connection with a first subscriber identity module (SIM) associated with a user equipment (UE), support a second RRC connection with a second SIM associated with the user equipment, and receive a message from the base station that the first RRC connection is a primary connection, wherein a message received via the primary connection to perform a specified function is also configured to perform the function on the second RRC connection.

An apparatus including a base station is also disclosed. The base station includes means for supporting a first radio resource control (RRC) connection with a first subscriber identity module (SIM) associated with a user equipment (UE), means for supporting a second RRC connection with a second SIM associated with the user equipment, and means for messaging an RRC configuration associated with each of the first and the second RRC connections, wherein the RRC configuration includes configurations common to both the first and the second SIMs and wherein the messaging comprises providing the common configurations over the first RRC connection and not the second RRC connection.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 7 is a table identifying a list of RRC functions or procedures and an identification of which SIMs of the DSDA UE can perform or execute the function.

FIG. 8A is a flowchart of wireless communication showing an example of the network releasing one RRC connection of a DSDA-UE.

FIG. 8B is a flowchart of wireless communication showing an example of the network releasing both RRC connections of a DSDA-UE.

FIG. 9A is a flowchart of wireless communications at a base station.

FIG. 9B is a flowchart of wireless communications at a user equipment (UE).

DETAILED DESCRIPTION

Figure 1:
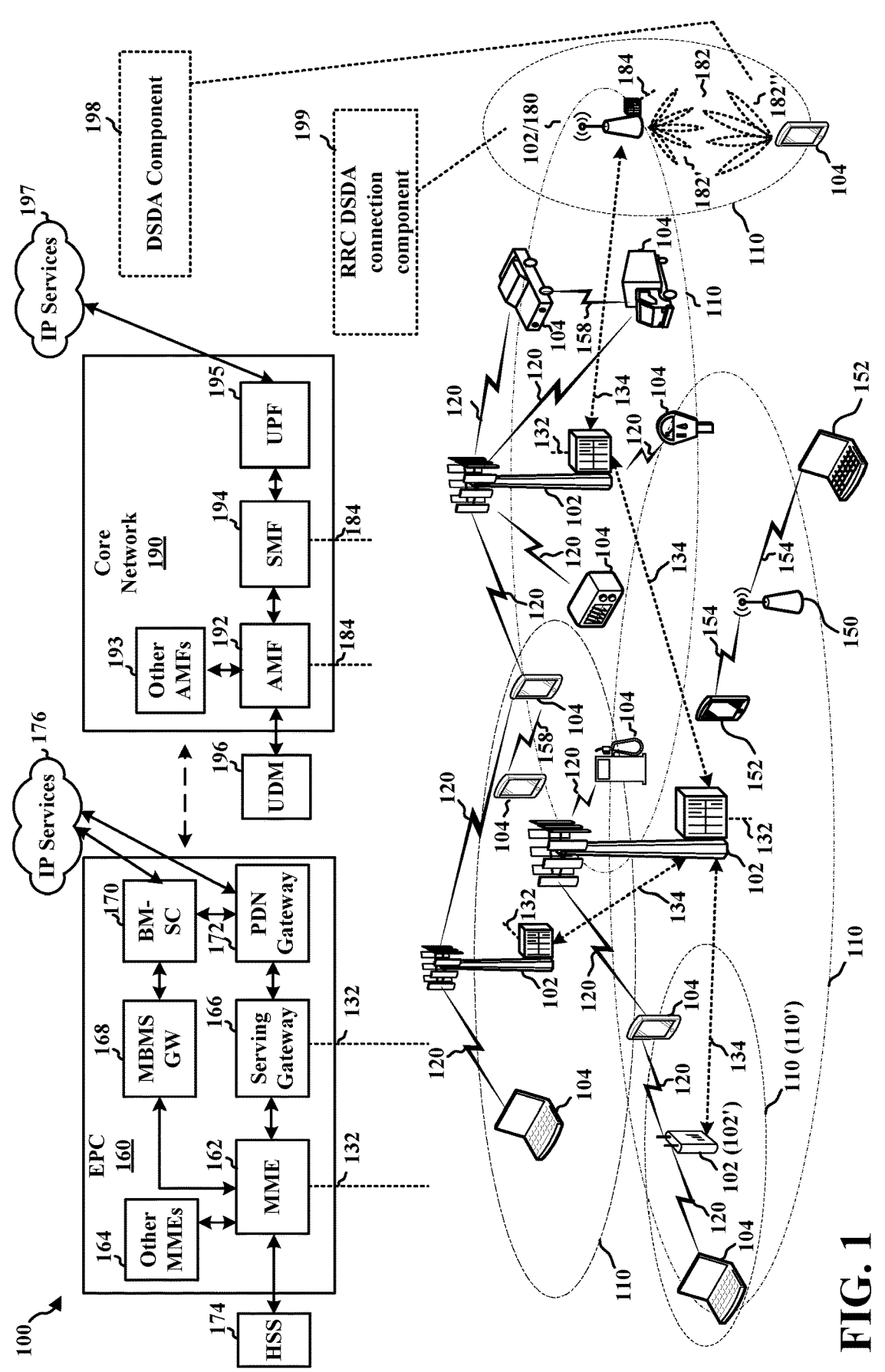
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MIME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the base station 180, such as a gNB, may include RRC DSDA connection component 199. Component 199 may be configured to perform a number of functions relating to DSDA UEs, including performing various advanced features with respect to RRC connection, configuration, reconfiguration, and release. For example, component 199 may be configured to assess and partition configurations within any of these RRC procedures that may common to both SIMs (e.g., in many cases the PHY, MAC, and other protocols), and those that may be specific to a procedure and different in either SIM (e.g., radio bearers and measurement configurations, for example). Component 199 may further be configured to identify types of common configuration (e.g., preferred or mandatory). Component 199 may further be configured to identify a primary SIM and a secondary SIM within a DSDA-based UE for purposes of streamlining procedures and protocols. Further, component 199 may be configured to generate connection configuration, reconfiguration and release messages that include flags to apprise the recipient UE of common features and related information to enable the UE to configure both SIMs without the need for bandwidth-consuming and latency-introducing redundant network configuration messages.

Referring again to FIG. 1, in certain aspects, the UE 104 may include a DSDA component 198. The DSDA component 198 may be configured to perform a number of different functions relative to a dual-SIM UE. These functions include, for example, handling RRC connection establishment, configuration, reconfiguration and release. The DSDA component 198 may be configured to identify the DSDA messages, to use information contained in flags of those messages to process the configuration commands and to set up the dual SIM configuration according to the network instructions. Component 199 may further be configured to designate a primary SIM and to perform procedures consistent with priorities given to such SIMs. Component 198 may include other features described in this disclosure.

Although the following description may be focused on DSDA, dual SIMs and RRC connections, the concepts described herein may be applicable to other similar areas, such as UEs with more than two SIMs and operations other than RRC. Further, although the following description may be focused on 5G NR, the concepts described herein may be applicable to other similar areas, such as LTE, LTE-A, CDMA, GSM, and other wireless technologies that may employ multi-SIM environment now or in the future.

Figures 2A, 2B, 2C, 2D:
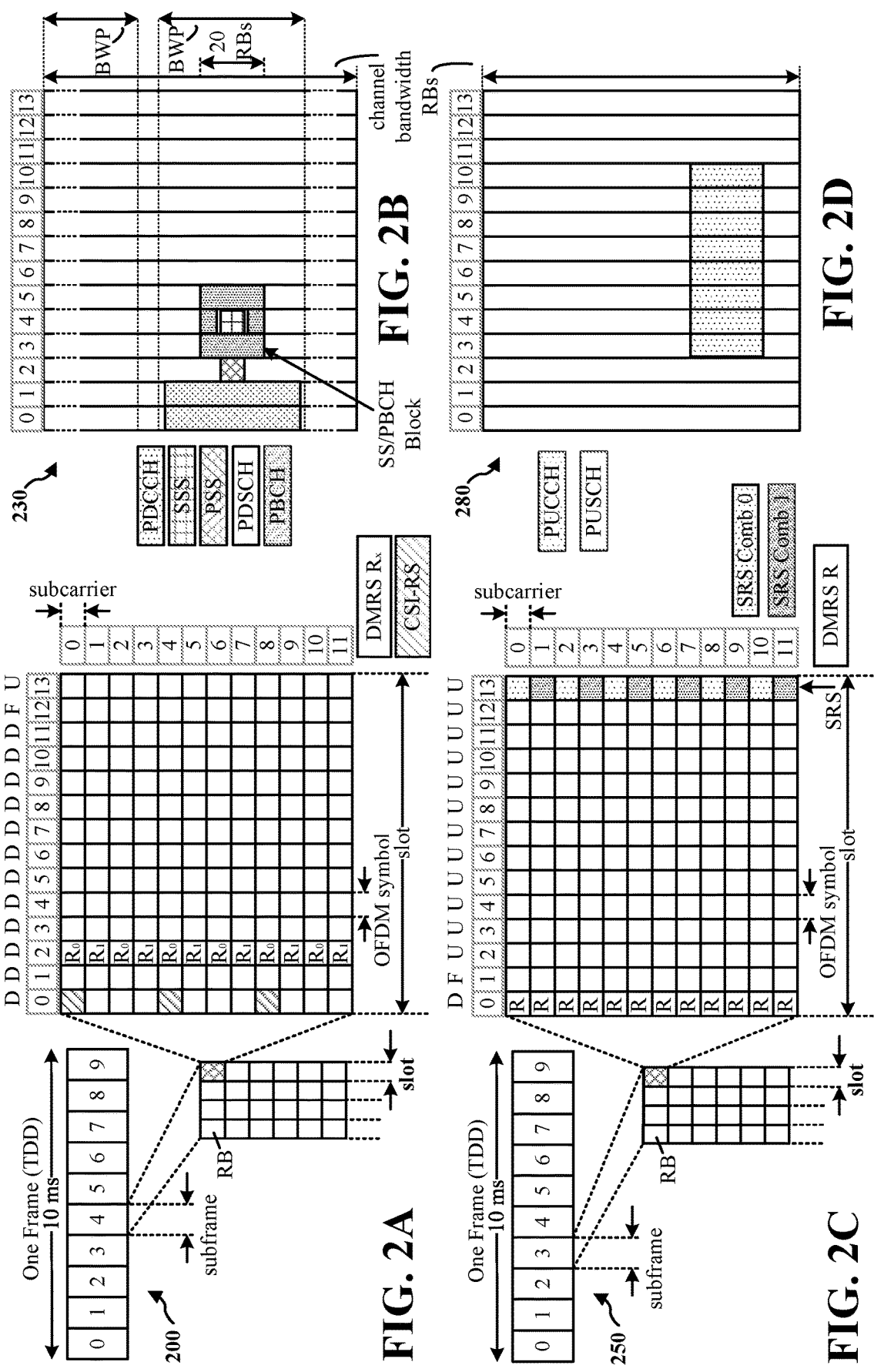
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu*15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100× is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A PDCCH within one BWP may be referred to as a control resource set (CORESET). Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) ACK/NACK feedback. The PUSCH carries data, and may additionally be used to carry a buffer status report (BSR), a power headroom report (PHR), and/or UCI.

Figure 3:
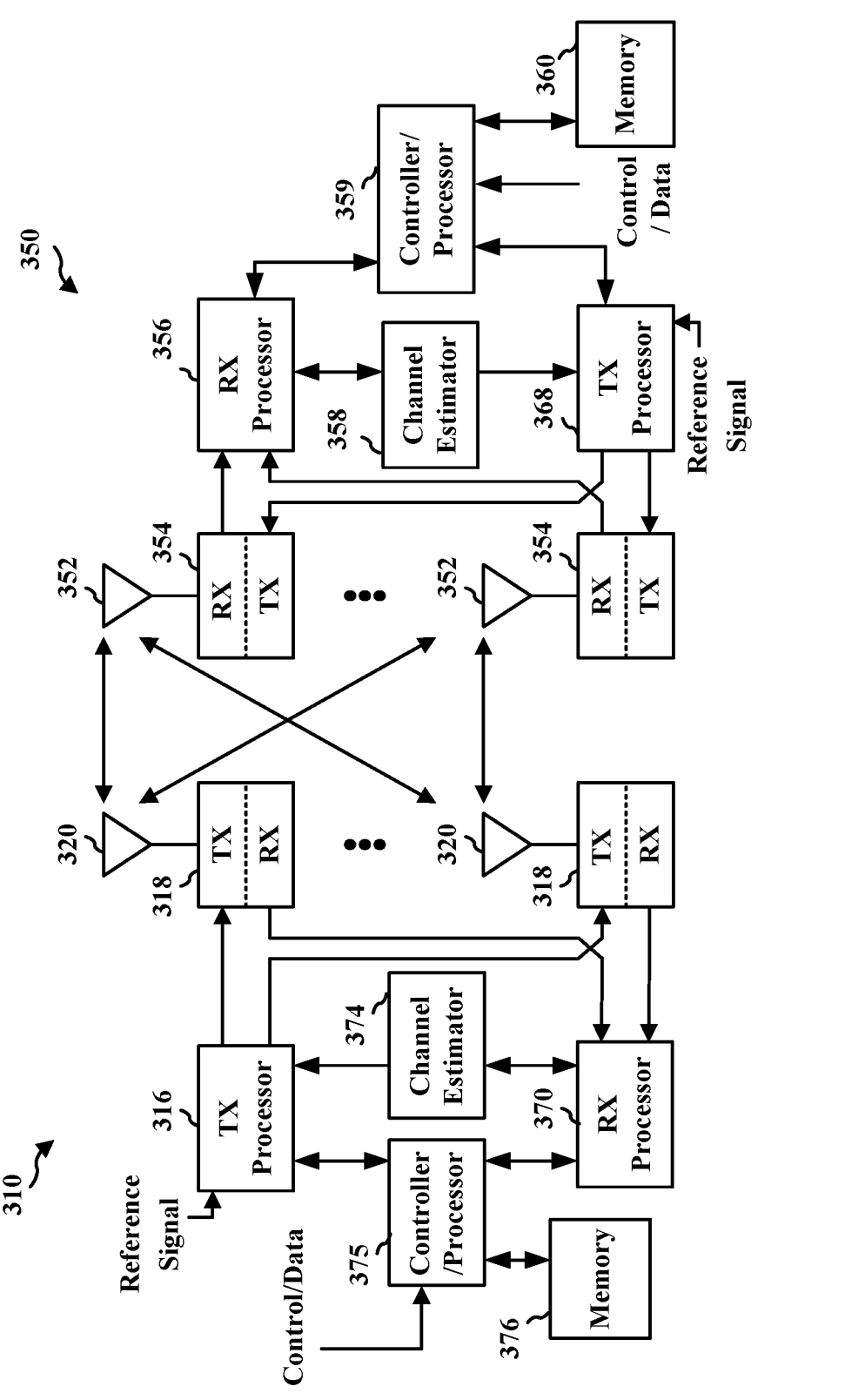
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC

160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with 198 of FIG. 1.

Common configurations. In one aspect of the disclosure, RRC reconfiguration messages for dual-SIM UEs may rely on common RRC configurations to integrate conventional tasks that may naturally, logically or even by necessity be commonly used for different RRC procedures in different SIMS that may populate the same UE, and to separate tasks that are logically, naturally, or necessarily separated. RRC reconfiguration is a command to modify an RRC connection. The Single Link Dual-SIM Dual Active (DSDA) RRC configuration can be partitioned into two discrete sections. First, there can be a configuration that is common to both SIMs. This includes, for example, the PHY and MAC configurations, which further include the PDCCH and DRX configurations, among others. Since just a single link exists between the UE and the gNB, such configurations can be common to both SIMS within the UE. Other types of common configurations may exist. These include mandatory common configurations and preferred common configurations. Having mandatory common configurations, such as the use of active Bandwidth parts, can by definition be necessary in light of the 5G NR architecture and the manner in which signals are transmitted and received. Still another type of the common configuration may include preferred common configurations. Preferred common configurations are not necessarily implemented as common configurations, but as the name suggests, they are generally implemented as common configurations due either to network architecture or to benefits that can be achieved from having them in common. One example of a preferred common configuration may include C-RNTI, which is an identifier used for identifying RRC connection and scheduling dedicated to a particular UE.

Different Configurations. Configurations may additionally include those that are different or independent for each SIM. Examples of different configurations may include, for example, signaling radio bearer (SRB) configurations, data radio bearer (DRB) configurations, and measurement configurations in which different sets of events may be established for measurement or assessment by the different SIMs.

Figure 4:
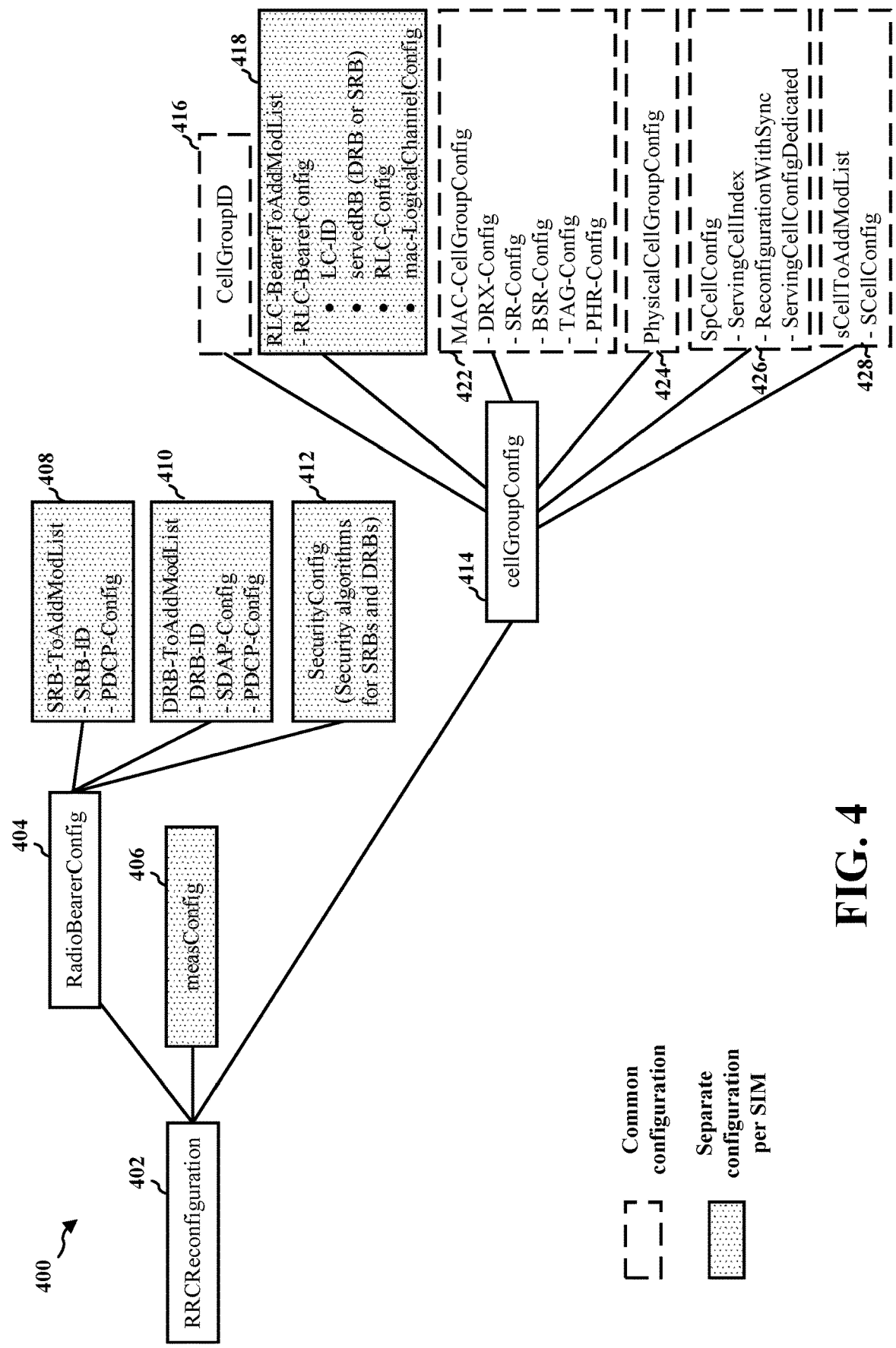
FIG. 4 is a diagram illustrating an exemplary grouping of information elements representing a viable DSDA technique for RRC reconfiguration.

FIG. 4 is a diagram 400 illustrating an exemplary grouping of information elements (IEs) representing a DSDA technique for RRC reconfiguration. The functions of FIG. 4 may be performed by the base station 180 (in some configurations together with component 199) and the UE 104 (in some configurations together with component 198), both in FIG. 1, the base station 310 of FIG. 3 and/or UE 350 of FIG. 3, and/or other elements of the specification, by way of example.

Diagram 400 represents functional groupings for RRC reconfiguration. Groupings may affect whether functions are performed, e.g., two or more times for a UE (i.e., functions that should be separated for each SIM in a dual-SIM UE), or conversely, functions that are more logically or naturally performed only once for both SIMS in a dual-SIM configuration. One benefit of the grouping of IEs shown in FIG. 4 is that only items that logically should go together are grouped, whereas differing functions for IEs (e.g., radio bearers, measurement configurations) are not. On the lower left of the figure is a legend identifying the dashed line that represents a common configuration and the solid line with the dotted internal pattern as a different per-SIM configuration. Thus, in FIG. 4, the general IE RRCReconfiguration 402 may be partitioned into RadioBearerConfig 404 (which includes the different radio bearers unique for that SIM), measConfig 406 and cellGroupConfig 414 (which includes a combination of common configurations and different configurations).

RadioBearerConfig 404 includes all separate configurations (408, 410, 412), whereas cellGroupConfig 414 includes a combination of common configurations (416, 422, 424, 426, 428) and different configurations (418). More specifically, in this example RadioBearerConfig 404 may be further split into three possible IE configurations, including "SRBToAddModList" 408 (SRB-ID and PDCP-Config), "DRB-ToAddModList" 410 (DRB-ID, SDAP-Config and PDCP-Config), and "SecurityConfig" 412 (or security algorithms of SRBs and DRBs). According to this partition, signal radio bearers (408) are split from data (410), and separately, security coding 412 can be provided to keep both SRBs and DRBs secure. Similarly, referring to the "RLC-BearerToAddModList" 418 and its entries "RLC-Bearer-Config" (e.g., "LC-ID", "servedRB (DRB or SRB)", "RLC- Config" and "mac-LogicalChannelConfig") involve independent configurations for each SIM.

The remaining groups of cellGroupConfig 414 can fall within the common configuration as per the legend. These IEs include CellGroupID 416, MAC-CellGroupConfig 422 (including configurations for DRX, SR, BSR, TAG and PHR), PhysicalCellGroupConfig 424, SPCellConfig 426 (including ServingCellIndex, ReconfigurationWithSynch, and ServingCellConfigDedicated), and sCellToAddModList 428 with SCellConfig. These elements, including configurations from PHY, MAC, DRX, and the like, fall within the common configurations.

In view of FIG. 4, a dual-SIM setup that conforms with the exemplary IE group of FIG. 4 can have a PHY and a MAC common for both the SIMs, whereas, using the same IE group as an illustration, the radio bearers may remain different so that different functions (e.g., voice and data) can remain dedicated to different respective radio bearers in a dual-SIM UE. For example, the grouping of IE 410 would allow separate data radio bearers for each SIM. Additionally, with reference to IEs 408 and 412, respectively it is advantageous to have the signaling radio bearers and security configuration different for each SIM to maintain higher levels of security and minimize data or security-based network breaches.

Still another benefit of implementing the DSDA system with a common configuration involves the case where the common configurations need to be updated. Rather than sending separate messages to both SIMs, the RRC reconfiguration message 402 on either RRC connection can update the common configurations of both SIMs. In various configurations, the message 402 can simply include a flag, for example, to notify the UE that the indicated configurations are to be updated for both the SIMs. This ability to provide common configuration updates using a single reconfiguration message can result in a substantial saving of bandwidth and can speed up the RRC reconfiguration operation by eliminating the overhead associated with dual messages having redundant information unnecessarily traversing the network.

Figure 5:
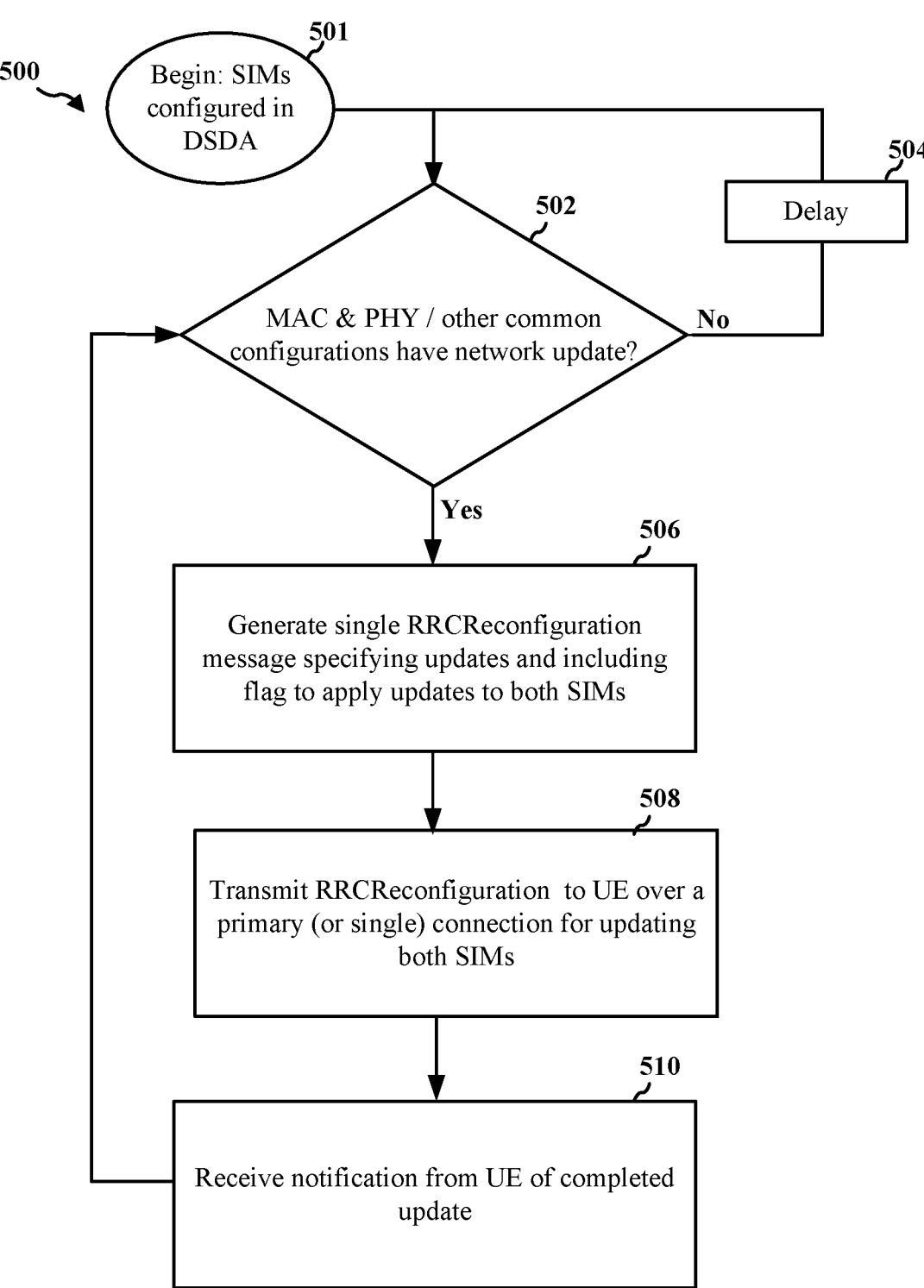
FIG. 5 is a flowchart of wireless communication for updating common configuration in a DSDA UE.

FIG. 5 is a flowchart 500 of wireless communication for updating a common configuration in a DSDA UE. Initially at 501, the two SIMS of a UE have been connected and are configured in DSDA. At 502, the network may advise the gNB whether an update is available for the MAC and PHY, or other common configuration for a UE. If not, delay element 504 is inserted simply to reflect that the update may come at some future time. Otherwise, as in 506, the gNB generates a single RRCReconfiguration message that specifies the PHY and MAC updates for the SIM associated with the primary connection and that includes a flag indicating that the PHY and MAC updates are to be included in the SIM associated with the secondary connection. The primary and secondary connections are discussed further below. At 508, the gNB transmits to the UE the RRCReconfiguration message over a primary connection, or otherwise a single connection. The gNB may in some embodiments receive at 510 at least one confirmation message from the UE that the update(s) was/were successfully completed. In this regard, both SIMs will be suitably updated without requiring the transmission of multiple messages.

More generally, in various implementations, techniques for dual-SIM implementations are disclosed that may configure the RRC configuration/reconfiguration functions to include a set of configurations that is common or shared on one hand, with a set of configurations that is distinct or contrasting, on the other hand. Particularly in the context of RRC connections and reconfiguration, the use of common configurations, where suitable, can enable the UE and network to avoid repetitive code and that can potentially render multi-SIM network performance faster and more efficient. At the same time, the use of different or independent configurations that give rise to the benefits of multi-SIM use in the first instance can preserve the security and unique functionality of the dual-SIM system, for RRC connections and otherwise.

In another aspect of the disclosure, RRC configurations during RRC connection establishment are provided. In various configurations, during RRC connection establishment for a first SIM when both SIMs are in the idle mode, the gNB may provide the PHY and MAC configurations to the UE along with the radio bearers (SRB, DRB) and measurement configurations in the RRCSetup (or in some configurations, the RRC Connection Setup) and RRCReconfiguration messages (see, e.g., FIG. 4).

In other configurations and depending on the network technology, the UE may initiate the above RRC messages using a RACH or other procedure. In these configurations, the gNB may use these messages to provide the PHY and MAC configuration to the UE along with the radio bearer (SRB, DRB) and measurement configurations as described above. Regardless of the specific configuration, the result is that one of the two SIMs is now RRC connected.

During RRC connection establishment for the second SIM when the other SIM is RRC connected as indicated above, the gNB may confirm that the PHY and MAC configurations are to be copied from the other SIM. If this is the case, the RRCSetup message may include a flag indication that the PHY and MAC (and potentially other common parameters including DRX) are to be copied from the previous session. As for the naturally separate configurations, including the radio bearer and measurement configurations described with reference to FIG. 4, that information is separately provided in the RRC Setup and/or RRCReconfiguration messages.

Figure 6:
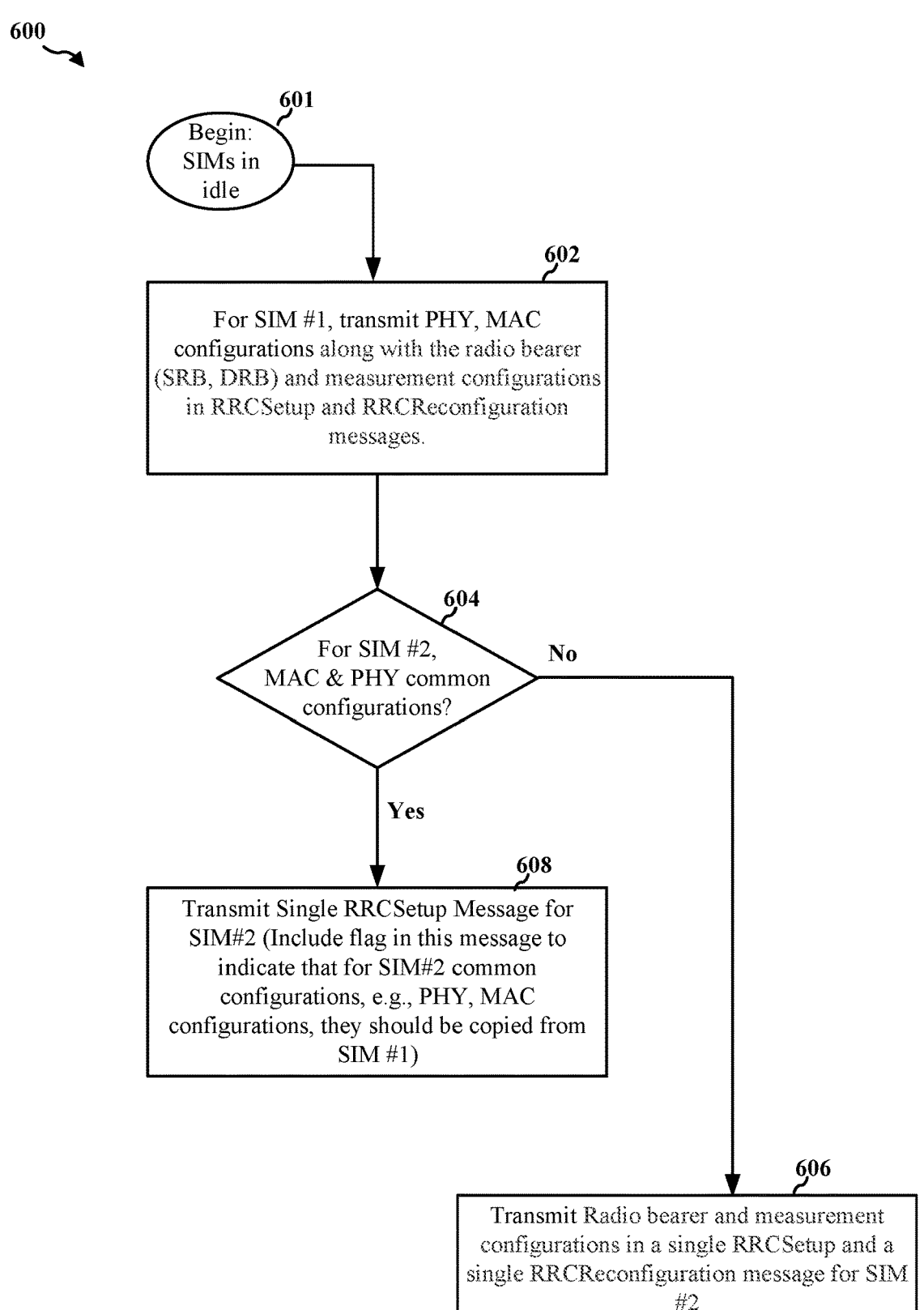
FIG. 6 is a flowchart of wireless communication for RRC configuration during connection establishment for a DSDA UE.

FIG. 6 is a flowchart 600 of wireless communication for RRC configuration during connection establishment for a DSDA UE. The steps in FIG. 6 can be performed by the base station 102/180 in FIG. 1 (in some implementations including RRC configuration component 199), or by the base station 310 in FIG. 3, or by other implementations of the base station and/or gNB described with reference to FIG. 12. Any DSDA UE, including UE 104 with DSDA component 198 of FIG. 1, UE 350, and other UEs illustrated and discussed in this disclosure (e.g., the UE in FIG. 11) may be applicable to the steps in FIG. 6.

At 601 the DSDA UE has both SIMs in an idle state. Thereupon, at 602, the base station (e.g., gNB 102/180) transmits, for a first SIM (e.g., SIM #1), PHY, MAC configurations along with the radio bearer (SRB, DRB) and measurement configurations in RRCSetup and RRCReconfiguration messages.

Next, at 604, the base station determines whether the SIMS in the UE (SIM #1 and SIM #2) share a common MAC and PHY configuration (or other common configuration). If they do not, then at 606, the base station separately transmits radio bearer and measurement configurations in a single RRCSetup and a single RRCReconfiguration message for SIM #2. However, if the base station at 604 determines that SIMS #1 and #2 do share MAC & PHY common configurations, then in one implementation at 608, the base station transmits a single RRCSetup message for SIM #2 for the configurations unique to SIM #2. Additionally, a flag is included in that same RRC Setup message to SIM #2 that SIM #2 common configurations (such as PHY, MAC configurations) should be copied from SIM #1 (based on the messages from step 602).

Accordingly, as the above information illustrates, the techniques described herein can result in considerable savings of bandwidth and resources, where applicable, by avoiding the dual transmission of otherwise identical information. The flag sent in the RRCSetup message represents an indication to the UE at the second SIM that the identified common information can be obtained directly from SIM #1 without causing further transmissions of the duplicative information over the network.

In another aspect of the disclosure, the gNB in a single-link DSDA setup can configure the RRC connections differently in part to limit the number of total transactions that need take place over the network without limiting the functionality or capabilities of the dual SIM setup. In one configuration, the gNB can configure one of the RRC connections to be the "primary" connection and the other RRC connection to be the "secondary" RRC connection. Thus, in certain exemplary implementations, an RRC connection of one of the SIMs may already be active. If at that point the other "new" RRC connection is being established (e.g., via the messaging or handshaking techniques described in part above), the gNB can deem that new RRC connection being established as the primary RRC connection.

Having established a criterion under which one of the two SIMs is a primary SIM, it can also be established with of the functions are those that only the primary SIM performs, versus functions that both SIMs can perform, for example.

FIG. 7 is a table identifying a list of RRC functions or procedures and an identification of which SIM of the DSDA UE can perform or execute the function or procedure. Column 702 identifies the RRC function or procedure. With respect to corresponding column 704, which indicates whether or not the indicated function can only be performed by the primary RRC SIM but not the secondary RRC SIM, the answer in this configuration is that the primary RRC SIM only performs the functions of (1) RLF (radio link failure) detection and recovery in the context of PHY, MAC and RLF detection, and (2) RRM (radio resource management) and measurement reporting. Thus, this conversely means in this configuration, as identified in column (3), that both the primary and secondary RRC SIMS are capable of performing every remaining function with the exception of the two aforementioned functions, the performance of which is relegated to the primary RRC SIM. The PHY/MAC/RLF detection as shown in column 702 includes detection information at the PHY or MAC layer of RLF, which information can then be provided to the RRC layer. This information is provided only to the primary RRC, as shown in the corresponding rows columns 704 and 706.

As an example, the gNB can determine which SIM will be the primary SIM. The primary SIM can then take on the additional two functions described above.

In another aspect of the disclosure, the DSDA procedures introduced herein can apply with equal force to streamline RRC release procedures. The RRC Release message can be used to release an RRC connection, for example, when the data transfers associated with all the data radio bearers (DRBs) are complete, even though the RRC connection on the other SIM in the UE may remain active. In various configurations, the RRC Release message as modified herein can be used to transition both RRC connections to idle in the cases where (i) one of the SIMs is connected and the other is idle, and (ii) both are connected. In one implementation, the release message is sent in the primary connection, with a flag to indicate that both connections should be released. As a result, the RRC configurations associated with both connections are released.

FIG. 8A is a flowchart 800 of wireless communication showing an example of the network releasing one RRC connection of a DSDA-UE. As per usual, the method may be performed by the gNB 180 at FIG. 1 (e.g., with component 199), the base station 310 at FIG. 3, and subsequent base stations as illustrated herein. The method of the UE may be performed by UE 104 of FIG. 1 (e.g., with component 198), the UE 350 of FIG. 3, and subsequent illustrated UEs.

The procedure begins at 801 when both primary and secondary SIMs are active on the DSDA-UE. At 806, the current RRC connection status is maintained, e.g., due to both SIMs connected due to a data transfer. until a designated time or event at which the network initiates a release of both connections. As 806 indicates, the objective is to transit one of the SIMs to idle when the activity (e.g., the data transfer) is complete. At 808 the process checks to determine of either of the SIMs is complete? If not, the connections remain active at 806. If one of the SIMs is complete, then at 812, the gNB sends an RRC release message to the completed SIM to release the RRC connection. The remaining connected SIM, regardless of whether it is primary or secondary, continues. The UE may send an acknowledgment of the released SIM at 814. FIG. 8A is exemplary in nature, and other configurations may be equally possible.

FIG. 8B is a flowchart 810 of wireless communication showing the network releasing both RRC connections of a DSDA-UE. Beginning at 816, both SIMs are connected. At 818, both SIMs of the DSDA-UE remain active. As indicated in 816, the exemplary objective here is for the network to transit both active connections to idle when some even occurs—here, when a timer expires.

If the timer does not expire at 820, the activity on the dual-SIMs resumes. If, however, the timer expires at 820, the network may release both SIMs. In the configuration at 822, in lieu of sending dual release messages over the network, the gNB sends an RRC message to the SIM associated with the primary connection with the release message. The same message includes a flag to indicate that both connections are to be released. Thus in the case where both SIMs are transitioned to idle, only one release message is needed (to the primary connection) and the flag can be used internally within the UE to release the secondary connection. At 824, the UE may acknowledge the RRC release message.

As is event in the above implementations, a single RRC Release message can advantageously be sent in two different very common circumstances, which obviates the need in those cases for two different release messages to populate network bandwidth.

FIG. 9A is a flowchart 900 of a method of wireless communication at a base station. The method may be performed by a base station (e.g., the base station 102/180; the apparatus 1002.) At 902, the gNB may support a first RRC connection with a first SIM associated with a UE. At 904, the gNB may support a second RRC connection with a second SIM associated with the UE. At 906, the gNB may message an RRC configuration associated with each of the first and the second RRC connections, wherein the RRC configuration includes configurations common to both the first and the second SIMs, and wherein the messaging comprises providing the common configurations over the first RRC connection and not the second RRC connection.

Figure 10:
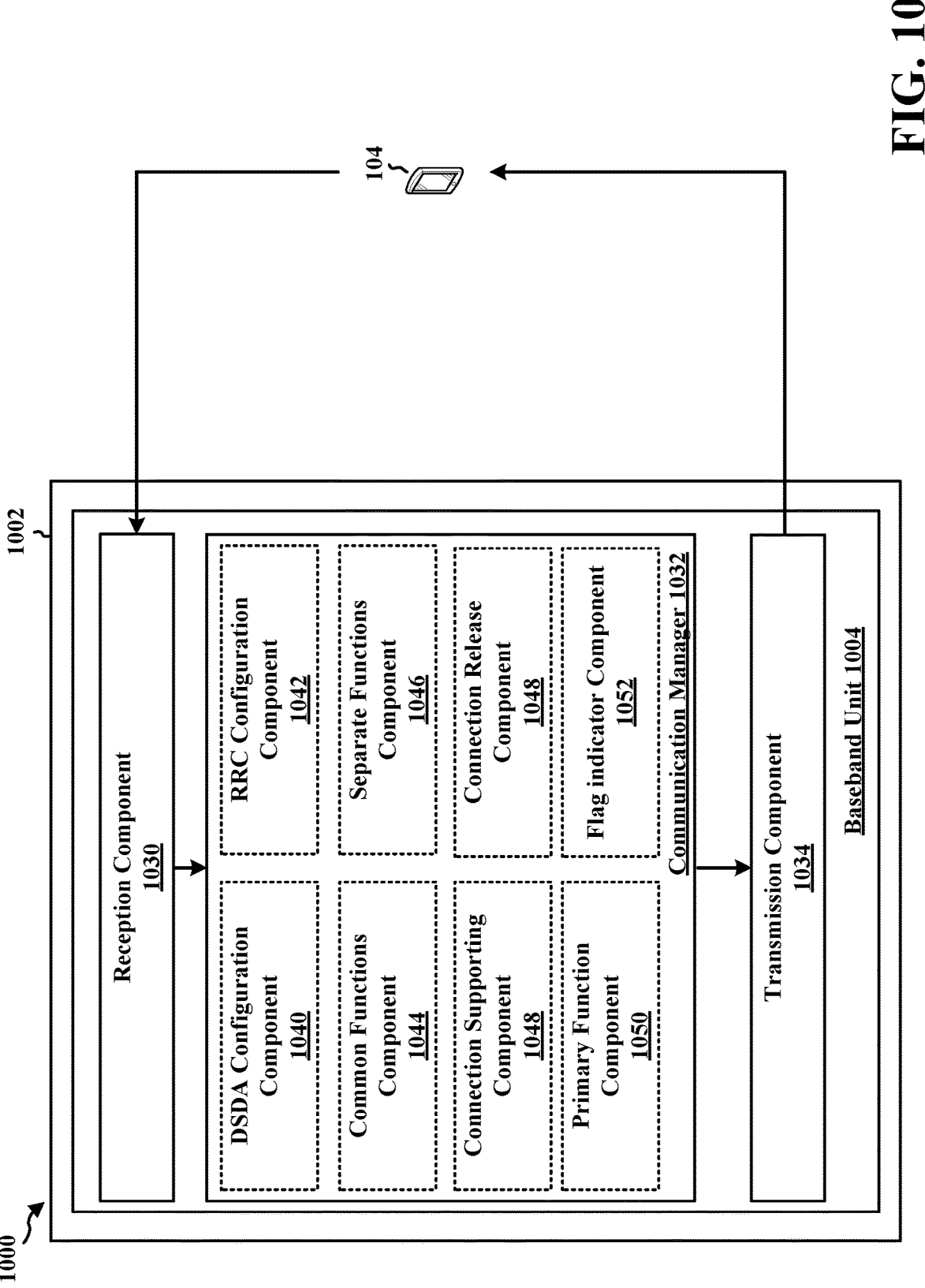
FIG. 10 is a diagram illustrating an example of a hardware implementation for an example apparatus which is a base station.

FIG. 9B is a flowchart 910 of wireless communications at a user equipment (UE). At 912, the UE supports a first RRC connection with a first subscriber identity module (SIM) associated with a UE. At 914, the UE supports a second RRC connection with a second SIM associated with the UE. Thereupon, at 916, the UE receives RRC configuration messaging from a base station, the messaging associated with each of the first and the second RRC connections, wherein the RRC configuration includes configurations common to both the first and the second SIMs and wherein receiving the messaging comprises receiving the common configurations over the first RRC connection and not the second RRC connection FIG. 10 is a diagram 1000 illustrating an example of a hardware implementation for an apparatus 1002. The apparatus 1002 is a BS and includes a baseband unit 1004. The baseband unit 1004 may communicate through a cellular RF transceiver with the UE 104. The baseband unit 1004 may include a computer-readable medium/memory. The baseband unit 1004 is responsible for general processing, including the execution of software stored on the computer-readable medium/memory. The software, when executed by the baseband unit 1004, causes the baseband unit 1004 to perform the various functions described supra. The computer-readable medium/memory may also be used for storing data that is manipulated by the baseband unit 1004 when executing software. The baseband unit 1004 further includes a reception component 1030, a communication manager 1032, and a transmission component 1034. The communication manager 1032 includes the one or more illustrated components. The components within the communication manager 1032 may be stored in the computer-readable medium/memory and/or configured as hardware within the baseband unit 1004. The baseband unit 1004 may be a component of the BS 310 and may include the memory 376 and/or at least one of the TX processor 316, the RX processor 370, and the controller/processor 375.

The communication manager 1032 includes a component DSDA configuration component 1040 that is configured to support UEs with SIMs connected in a DSDA configuration, e.g., as described in connection with steps 501 and 601 of FIG. 5 and FIG. 6. The communication manager 1032 further includes an RRC configuration component 1042 that supports a first and second radio resource control (RRC) connections with respective first and second subscriber identity modules (SIM) associated with a user equipment (UE), e.g., as described in connection with steps 902 and 904 of FIG. 9A. The communication manager 1032 further includes a common functions component 1044 that is configured to support an RRC configuration associated with each of the first and the second RRC connections, wherein the RRC configuration includes configurations common to both the first and the second SIMS, and wherein the messaging comprises providing the common configurations over the first RRC connection and not the second RRC connection e.g., as described in connection with step 906 of FIG. 9A.

The communication manager 1032 further includes a separate functions component 1046, which is configured to provide support and configurations to connections that have separate RRC configurations, such as the radio bearers and the measurement configuration report, as described in greater detail in the call flow diagram of FIG. 4, e.g., at elements 408, 410 and 412. The communication manager 1032 also includes a connection supporting component 1048, which in part is configured to provide support for each individual SIM in a DSDA configuration, as described with respect to steps 902 and 904 of FIG. 9A. The communication manager 1032 also includes a connection release component 1048, which is configured to provide the dual-SIM release functions using a primary connection for both SIMs or using one of the two connections where only one SIM is released, as set forth in the various components of FIGS. 8A and 8B. The communication manager 1032 further includes a primary function component 1050, which is configured to message a connection in a DSDA UE and to make the relevant RRC connection the primary connection such that future actions need only be messaged to the primary connection and inclusion of a flag indication will allow the function of the message to apply to the secondary RRC connection, as set forth in step 508 of FIG. 5 and set forth in FIG. 7. The communication manager 1032 also includes a flag indicator component 1052, which is configured to provide the different messages with a flag indicator to enable the UE to apply the function of the message to both RRC connections without requiring that the connection be sent twice, as set forth, for example, in step 506 of FIG. 5, step 608 in FIG. 6 and step 822 of FIG. 8B

The apparatus may include additional components that perform each of the blocks of the algorithm in the aforementioned flowcharts of FIGS. 5, 6 and 8-10. As such, each block in the aforementioned flowcharts of FIGS. 5, 6 and 8-10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1002, and in particular the baseband unit 1004, includes means for means for supporting a first radio resource control (RRC) connection with a first subscriber identity module (SIM) associated with a user equipment (UE); means for supporting a second RRC connection with a second SIM associated with the user equipment; means for messaging an RRC configuration associated with each of the first and the second RRC connections, wherein the RRC configuration includes configurations common to both the first and the second SIMs and wherein the messaging comprises providing the common configurations over the first RRC connection and not the second RRC connection; means for supporting a first radio resource control (RRC) connection with a first subscriber identity module (SIM) associated with a user equipment (UE); means for supporting a second RRC connection with a second SIM associated with the user equipment; means for messaging an RRC configuration associated with each of the first and the second RRC connections, wherein the RRC configuration includes configurations common to both the first and the second SIMs and wherein the messaging comprises providing the common configurations over the first RRC connection and not the second RRC connection and means for providing a release message over the first RRC connection to release the first RRC connection, wherein the release message includes a flag to release the second RRC connection; and means for releasing one of the first and the second RRC connections while the other one of the first and second RRC connections remain active.

The aforementioned means may be one or more of the aforementioned components of the apparatus 1002 configured to perform the functions recited by the aforementioned means. As described supra, the apparatus 1002 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 11:
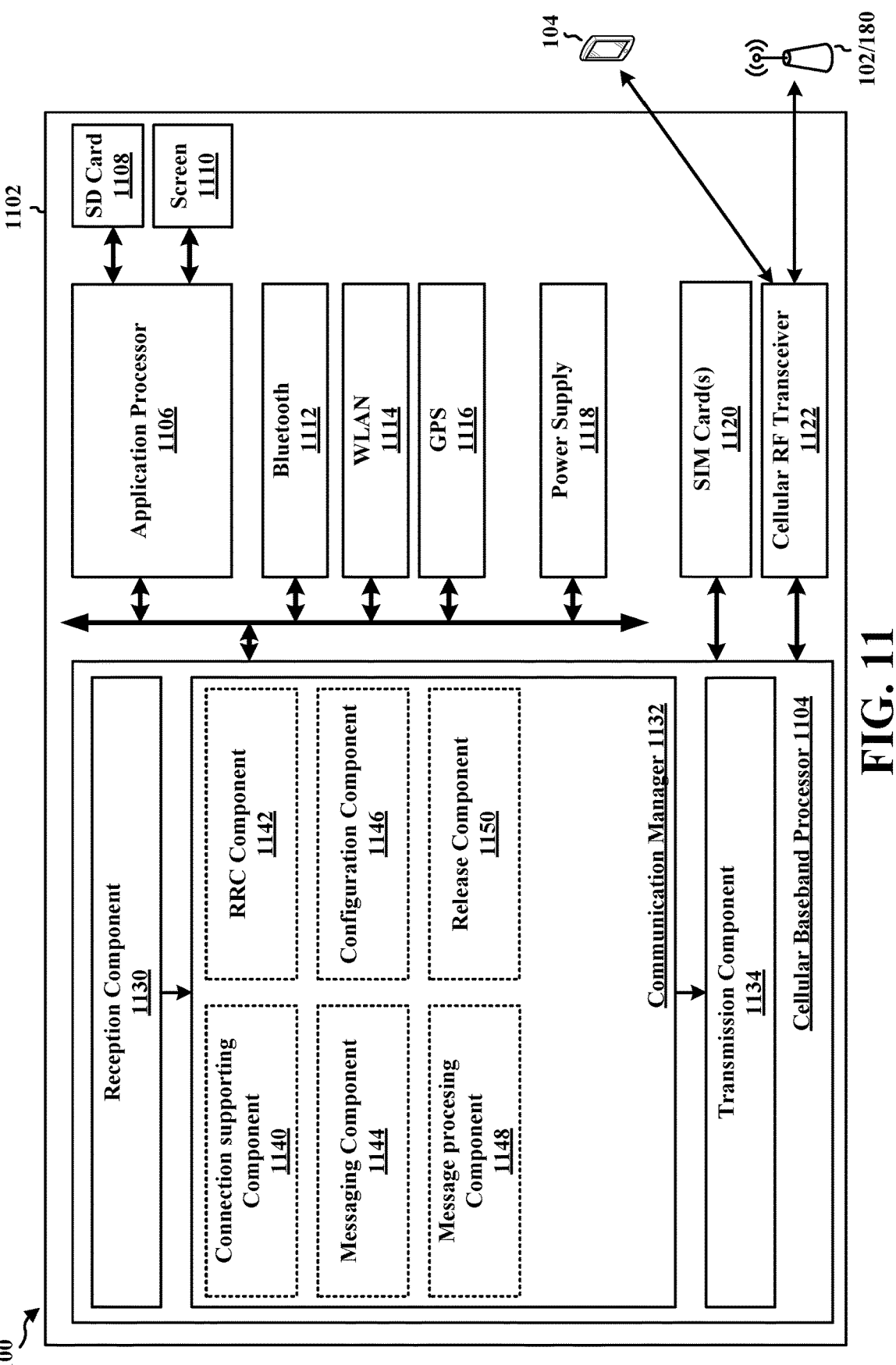
FIG. 11 is a diagram illustrating an example of a hardware implementation for an example apparatus which is a user equipment.

FIG. 11 is a diagram 1100 illustrating an example of a hardware implementation for an apparatus 1102. The apparatus 1102 is a UE and includes a cellular baseband processor 1104 (also referred to as a modem) coupled to a cellular RF transceiver 1122 and one or more subscriber identity modules (SIM) cards 1120, an application processor 1106 coupled to a secure digital (SD) card 1108 and a screen 1110, a Bluetooth module 1112, a wireless local area network (WLAN) module 1114, a Global Positioning System (GPS) module 1116, and a power supply 1118. The cellular baseband processor 1104 communicates through the cellular RF transceiver 1122 with the UE 104 and/or BS 102/180. The cellular baseband processor 1104 may include a computer-readable medium/memory. The computer-readable medium/memory may be non-transitory. The cellular baseband processor 1104 is responsible for general processing, including the execution of software stored on the computer-readable medium/memory. The software, when executed by the cellular baseband processor 1104, causes the cellular baseband processor 1104 to perform the various functions described supra. The computer-readable medium/memory may also be used for storing data that is manipulated by the cellular baseband processor 1104 when executing software. The cellular baseband processor 1104 further includes a reception component 1130, a communication manager 1132, and a transmission component 1134. The communication manager 1132 includes the one or more illustrated components. The components within the communication manager 1132 may be stored in the computer-readable medium/memory and/or configured as hardware within the cellular baseband processor 1104. The cellular baseband processor 1104 may be a component of the UE 350 and may include the memory 360 and/or at least one of the TX processor 368, the RX processor 356, and the controller/processor 359. In one configuration, the apparatus 1102 may be a modem chip and include just the baseband processor 1104, and in another configuration, the apparatus 1102 may be the entire UE (e.g., see 350 of FIG. 3) and include the aforediscussed additional modules of the apparatus 1102.

The communication manager 1132 includes a component 1140 that is configured to support both connections in a dual-SIM UE, including both RRC connections to and from SIM1 and SIM2, e.g., as described in connection with steps 912, 914 and 916 in FIG. 9B. The communication manager 1132 further includes a component 1142 that receives input in the form of connection information from the component 1140 and is configured to provide support and management for RRC connections, including in dual-SIM configurations, e.g., as described in connection with FIG. 9B, step 501 in FIG. 5 and step 601 in FIG. 6. The communication manager 1132 further includes a component 1144 that receives input in the form of messages received from the network on the RRC connections from the component 1140 and is configured to appropriately process those connections and configurations, e.g., as described in connection with steps 806, 808, and 812 of FIG. 8A and 818, 820 and 822 of FIG. 8B. The communication manager 1132 also receives a configuration component 1146 for determining whether a primary or secondary component is within a DSDA UE and the means for managing the connection in view of its status, e.g., as a primary component, as set forth generally in FIG. 7.

The communication manager 1132 further includes a message processing component 1148 that works in conjunction with messaging component 1144 to receive and process the different types of messages for the RRC connections of the dual SIMM, including RRC configuration, Reconfiguration, Reestablishment, Release, and the like, as generally set forth in the information elements of FIG. 4 and in the individual steps of FIGS. 5, 6, 8A, 8B, and 9B.

The apparatus may include additional components that perform each of the blocks of the algorithm in the aforementioned flowcharts of FIGS. 5, 6, 8A, 8B, and 9B. As such, each block in the aforementioned flowcharts of FIGS. 5, 6, 8A, 8B, and 9B may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a base station, comprising:
  supporting a first radio resource control (RRC) connection with a first subscriber identity module (SIM) associated with a user equipment (UE);
  supporting a second RRC connection with a second SIM associated with the user equipment; and
  messaging an RRC configuration associated with each of the first and the second RRC connections, wherein the RRC configuration includes configurations common to both the first and the second SIMs and wherein the messaging comprises providing the common configurations over the first RRC connection and not the second RRC connection, and wherein the messaging comprises providing a flag over the first RRC connection indicating that the common configurations provided over the first RRC connection are for both the first and the second SIMs.

2. The method of claim 1, wherein the RRC configuration further comprises configurations that are different for each of the first and the second SIMs, wherein the configurations that are different comprise at least one of a radio bearer configuration or a measurement configuration.

3. The method of claim 1, wherein the common configurations include at least one of a physical layer (PHY) configuration or a medium access control (MAC) layer configuration.

4. The method of claim 1, further comprising establishing the RRC connection for the first SIM while both the first and the second SIMs are idle, wherein the messaging comprises providing the RRC configuration for the first SIM during the establishment of the RRC connection.

5. The method of claim 1, further comprising releasing one of the first and the second RRC connections while the other one of the first and second RRC connections remain active, wherein releasing one of the first and the second RRC connections is performed by transmitting an RRC release message to the UE.

6. The method of claim 1, further comprising providing a release message over the first RRC connection to release the first RRC connection, wherein the release message includes a flag to release the second RRC connection.

7. A method of wireless communication at a user equipment (UE), comprising:
  supporting a first radio resource control (RRC) connection with a first subscriber identity module (SIM) associated with a user equipment (UE);
  supporting a second RRC connection with a second SIM associated with the user equipment; and
  receiving RRC configuration messaging from a base station, the messaging associated with each of the first and the second RRC connections, wherein the RRC configuration includes configurations common to both the first and the second SIMs and wherein receiving the messaging comprises receiving the common configurations over the first RRC connection and not the second RRC connection, and wherein the messaging comprises providing a flag over the first RRC connection indicating that the common configurations provided over the first RRC connection are for both the first and the second SIMs.

8. The method of claim 7, wherein the RRC configuration further comprises configurations that are different for each of the first and the second SIMs, wherein the configurations that are different comprise at least one of a radio bearer configuration or a measurement configuration.

9. The method of claim 7, wherein the common configurations include at least one of a physical layer (PHY) configuration or a medium access control (MAC) layer configuration.

10. The method of claim 7, further comprising receiving messaging from the base station establishing the RRC connection for the first SIM while both the first and the second SIMs are idle, wherein receiving the messaging comprises receiving the RRC configuration for the first SIM during the establishment of the RRC connection.

11. The method of claim 10, further comprising receiving messaging from the base station establishing the RRC connection for the second SIM following the establishment of the RRC connection for the first SIM, wherein receiving the RRC configuration for the second SIM comprises receiving a flag over the second RRC connection indicating to the second SIM to copy the common configurations of the first SIM.

12. The method of claim 7, further comprising receiving messaging to release one of the first and the second RRC connections while the other one of the first and second RRC connections remain active, wherein releasing one of the first and the second RRC connections comprises receiving RRC release messaging from the base station.

13. The method of claim 7, further comprising receiving a release message over the first RRC connection to release the first RRC connection, wherein the release message includes a flag to release the second RRC connection.

14. A base station, comprising:

a memory;

at least one processor coupled to the memory and configured to:

support a first radio resource control (RRC) connection with a first subscriber identity module (SIM) associated with a user equipment (UE);

support a second RRC connection with a second SIM associated with the user equipment; and message an RRC configuration associated with each of the first and the second RRC connections, wherein the RRC configuration includes configurations common to both the first and the second SIMs and wherein the messaging comprises providing the common configurations over the first RRC connection and not the second RRC connection, and wherein the messaging comprises providing a flag over the first RRC connection indicating that the common configurations provided over the first RRC connection are for both the first and the second SIMs.

15. The base station of claim 14, wherein the RRC configuration further comprises configurations that are different for each of the first and the second SIMs.

16. The base station of claim 14, wherein the common configurations include at least one of a physical layer (PHY) configuration or a medium access control (MAC) layer configuration.

17. The base station of claim 14, wherein the at least one processor is further configured to establish the RRC connection for the first SIM while both the first and the second SIMs are idle, wherein the message comprises providing the RRC configuration for the first SIM during the establishment of the RRC connection.

18. The base station of claim 17, wherein the at least one processor is further configured to establish the RRC connection for the second SIM following the establishment of the RRC connection for the first SIM, wherein the message for providing the RRC configuration for the second SIM comprises a flag indicating to the second SIM to copy the common configurations of the first SIM.

19. The base station of claim 18, wherein the message further comprises the configurations for the second SIM that are different from the first SIM.

20. The base station of claim 14, wherein the at least one processor is further configured to release one of the first and the second RRC connections while the other one of the first and second RRC connections remain active, wherein the release of one of the first and the second RRC connections is performed by transmitting an RRC release message to the UE.

21. The base station of claim 14, wherein the at least one processor is further configured to provide a release message over the first RRC connection to release the first RRC connection, wherein the release message includes a flag to release the second RRC connection.

* * * * *